United States Patent [19]

Tanaka et al.

[11] Patent Number: 5,358,566
[45] Date of Patent: Oct. 25, 1994

[54] CEMENT DISPERSING AGENT

[75] Inventors: Yoshio Tanaka, Komae; Minoru Yaguchi; Teruhiko Yamamoto, both of Chigasaki, all of Japan

[73] Assignee: Sandoz Ltd., Basel, Switzerland

[21] Appl. No.: 609,288

[22] Filed: Nov. 5, 1990

[30] Foreign Application Priority Data

Nov. 6, 1989 [JP] Japan ................. 1-288170

[51] Int. Cl.$^5$ ................. C04B 24/02; C08F 20/00
[52] U.S. Cl. ................. 106/823; 106/808; 106/810; 106/819; 524/5; 525/77; 525/78; 525/79; 525/80; 525/81; 525/82; 526/317.1; 526/318.2; 526/318.3; 526/319; 526/321; 526/328.5; 526/329.7; 562/590
[58] Field of Search ............. 106/808, 810, 819, 823; 562/590; 526/317.1, 318.2, 318.3, 319, 321, 328.5, 329.7; 524/5; 525/77, 78, 79, 80, 81, 82

[56] References Cited

U.S. PATENT DOCUMENTS

| 2,614,998 | 10/1952 | Lea . | |
|---|---|---|---|
| 3,937,633 | 2/1976 | Knight et al. . | |
| 4,040,984 | 8/1977 | Sharpe, Jr. et al. . | |
| 4,786,331 | 11/1988 | Ueda et al. | 106/823 |
| 4,792,360 | 12/1988 | Pierce et al. | 106/823 |
| 4,888,059 | 12/1989 | Yamaguchi et al. | 106/823 |
| 4,963,190 | 10/1990 | Mizunuma et al. | 106/823 |
| 4,978,392 | 12/1990 | Kilbarger et al. | 106/822 |
| 5,028,271 | 7/1991 | Huddleston et al. | 106/823 |
| 5,116,421 | 5/1992 | Ganguli | 106/810 |

FOREIGN PATENT DOCUMENTS

| 75641/87 | 1/1988 | Australia . |
| 23673/88 | 4/1989 | Australia . |
| 33109/89 | 10/1989 | Australia . |
| 34939/89 | 11/1989 | Australia . |
| 0032570 | 7/1981 | European Pat. Off. . |
| 0072214 | 8/1982 | European Pat. Off. . |
| 0073412 | 3/1983 | European Pat. Off. . |
| 0137582 | 4/1985 | European Pat. Off. . |
| 0196678 | 11/1986 | European Pat. Off. . |
| 1283726 | 11/1968 | Fed. Rep. of Germany . |
| 1493046 | 8/1967 | France . |
| 2388833 | 11/1978 | France . |
| WO87/06594 | 11/1987 | PCT Int'l Appl. . |
| 717223 | 10/1954 | United Kingdom . |

Primary Examiner—Anthony Green
Attorney, Agent, or Firm—Robert S. Honor; Richard E. Vila; Carol A. Loeschorn

[57] ABSTRACT

An aqueous solution, for use as a cement dispersing agent, of a polymer salt, which is formed by reacting a polycarboxylic acid with a nitrogenous acrylic polymer.

9 Claims, No Drawings

CEMENT DISPERSING AGENT

The invention relates to a new dispersing agent for preventing reduction in fluidity in cement compositions.

The term cement composition refers to a mixture of neat cement or cement to which aggregate has been added with one or more various kinds of admixtures and water, for example cement paste, cement grout, mortar and concrete.

Water reducing agents have been proposed for use in cement compositions and in particular high range water reducing agents to increase the fluidity of concrete. However, such high range water reducing agents result in a gradual decline in the slump (slump loss with a lapse of time). This is a real problem because the majority of concrete used nowadays in construction sites is supplied as a ready mix concrete. Therefore to prevent slump loss after mixing, high range water reducing agents are added to the concrete as an on site or delayed addition. However, such an addition requires special facilities and technicians for the purpose and is a bothersome operation. Furthermore, water reducing agents that act as slump loss inhibiting agents vary in performance.

The addition of cement dispersing agents has been proposed to overcome these problems. However, the presence of known cement dispersing agents tend to produce a problem in long term stability and/or duration of fluidity and/or slump loss.

To alleviate these problems, according to the invention there is provided an aqueous solution, for use as a cement dispersing agent, of a polymer salt, which is formed by reacting a polycarboxylic acid with a nitrogenous acrylic polymer. Preferably the solution is at neutral pH, more preferably pH 6.5–7.5.

The polymer salt solution according to the invention can be directly added to a cement composition.

The polymer salt solution according to the invention reduces the tendency for a cement composition to lose fluidity gradually with the elapse of time after mixing.

Preferably the polymer salt according to the invention is the reaction product of 1 part by weight of a polycarboxylic acid and 0.001 to 10 parts by weight of a nitrogenous acrylic polymer, more preferably 0.005 to 1 part by weight of nitrogenous acrylic polymer.

Preferably the polycarboxylic acid is one that is obtained from a monomer selected from
   methacrylic acid,
   crotonic acid,
   maleic anhydride,
   maleic acid,
   maleic monoester,
   tetrahydrophthalic anhydride,
   tetrahydrophthalic acid, acrylic acid and
   a monomer capable of being copolymerized with one or more of the above.

More preferably the polycarboxylic acids are selected from:
   a copolymer of (meth)acrylic acid and hydroxypropyl (meth)acrylate,
   a copolymer of (meth)acrylic acid and methyl polyethylene glycol (meth)acrylate,
   a copolymer of styrene and methyl polyethylene glycol maleate,
   a copolymer of styrene and butyl maleate,
   a copolymer of methyl polyethylene glycol allyl ether and maleic acid,
   a copolymer of vinyl acetate and maleic acid and
   a copolymer of methyl vinyl ether and maleic acid.

Preferably the nitrogenous acrylic polymer is one obtained from a monomer selected from
   dialkyl amino alkyl methacrylamide,
   dialkyl amino alkyl acrylamide,
   monoalkyl methacrylamide,
   monoalkyl acrylamide
   dialkyl methacrylamide,
   dialkyl acrylamide
   methacryloyl dicyanodiamide,
   acryloyl dicyanodiamide,
   dialkyl aminoalkyl methacrylate,
   dialkyl amino alkyl acrylate and
   a monomer capable of being copolymerized with one or more of the above mentioned monomers. In this specification the term (meth)acrylate covers methacrylate and acrylate.

More preferably the nitrogenous acrylic polymers are selected from:
   a copolymer of acrylamide and methacryloyl dicyanodiamide,
   a copolymer of acrylamide and dimethyl aminopropyl methacrylamide,
   a copolymer of acrylamide and dimethyl aminoethyl methacrylate,
   a copolymer of acrylamide and dimethyl aminomethyl acrylamide, and
   a copolymer of acrylamide and dimethyl acrylamide.

A polymer salt according to the invention is stable in the acidic or neutral pH range while in the alkaline range it gradually dissociates and gives polyanions obtained from the polycarboxylic acid and cations or nonionic residues of the nitrogenous acrylic polymer. When this polymer salt is added to a cement composition, since usually the pH of the liquid phase of the cement composition is approximately 12, immediately after addition, dissociation begins of the part of the polymer salt which is comparatively weakly bound and polyanions obtained by dissociation are absorbed on cement particles to disperse the cement particles thereby acting as a cement dispersing agent.

That part of the polymer salt which has not yet dissociated cannot be absorbed onto the cement particles immediately after the addition and so does not act to disperse the cement particles. With the lapse of time, the non-dissociated part of the polymer salt gradually dissociates and ultimately practically all the polymer salt dissociates and with dissociation, cement dispersion properties are demonstrated. In this way the cement composition retains fluidity over a long period of time and there is an effective prevention of slump loss. In recent years, ready mix concrete is frequently required to be on the road for a long time and, as a result there is a real problem of decline in slump with time. By the addition of the polymer salt according to the invention, fluidity loss and slump loss are reduced of the ready mix concrete very well.

The dosage of the solution of the polymer salt according to the invention is a cement dispersing quantity. More preferably the amount of polymer salt solution added is 0.05 to 2% of cement present in the cement composition (preferably at 20° C.).

It is preferable to add the polymer salt solution according to the invention at the time of mixing concrete at the manufacturing plant. However, it is also possible to add the polymer salt solution according to the invention at any time after mixing at the manufacturing plant has occurred.

It is possible to use additionally one or more water reducing agents conventially widely known and used in the concrete industry together with the cement dispersing agent according to the invention. Such water reducing agents are preferably the condensation product of formaldehyde and naphthalene sulphonic acid, the condensation product of formaldehyde and melamine sulphonic acid, a lignosulfonate, a polycarboxylic acid (or its salt), an oxycarboxylate, a glucosaccharide, a copolymer of chain or cyclic olefin of 4 to 6 carbon atoms and ethylenic unsaturated dicarboxylic anhydride.

When a polymer salt solution according to the invention is added to a ready mix concrete in which a water reducing agent (especially a high range water reducing agent) has been added, it will cause high fluidity to be maintained with substantially no time dependent slump loss. This contributes to improved work efficiency at construction sites and to improved concrete quality, by preventing defective parts forming in hardened concrete.

Further according to the invention there is provided a cement composition comprising:
(A) cement
(B) a polymer salt according to the invention, and
(C) water.

Preferably the amount of polymer salt present in such a composition is 0.05–2% by weight of the amount of cement. Preferably the amount of water present is from 100 to 400% by weight of cement present in the composition.

Preferably the polymer salt is present in the form of an aqueous solution, preferably at neutral pH.

Still further according to the invention there is provided a polymer salt formed by reacting a nitrogenous acrylic polymer with a polycarboxylic acid.

Preferably the amount of nitrogenous acrylic polymer is 0.001 to 10 parts per 1 part of polycarboxylic acid, more preferably 0.005 parts to 1 part of nitrogenous acrylic polymer to 1 part of polycarboxylic acid.

The invention will be illustrated described by the following examples.

In the following examples polycarboxylic acid will be abbreviated to PCA and nitrogenous acrylic polymer will be abbreviated to NAP. The monomers used are given in Table 1 and in Table 2 below.

In Tables 1 and 2 the symbols are as follows:

TABLE 1

| | |
|---|---|
| MMA - | methacrylic acid |
| HPMA - | hydroxypropyl methacrylate |
| AA - | acrylic acid |
| HEA - | hydroxyethyl acrylate |
| MPEGMA - | methyl polyethylene glycol methacrylate |
| ST - | styrene |
| BUMLA - | butyl maleate |
| MPEGMLA - | methyl polyethylene glycol maleate |
| MPEGAE - | methyl polyethylene glycol allyl ether |
| MLA - | maleic cid |
| VAC - | vinyl acetate |
| MVE - | methyl vinyl ether |
| THPA - | tetrahydrophthalic acid |
| MMA - | methyl acrylate |

TABLE 2

| | |
|---|---|
| AH - | acrylamide |
| DMAPMAM - | dimethyl aminopropyl methacrylamide |
| MADCDA - | methacryloyl dicyanodiamide |
| DMEMA - | dimethyl aminoethyl methacrylate |

TABLE 2-continued

| | |
|---|---|
| DMMAM - | dimethyl aminomethyl acrylamide |
| DMAM - | dimethyl acrylamide |
| ADCDA - | acryloyl dicyanodiamide |
| MMAM - | monomethyl acrylamide |
| ST - | styrene |

EXAMPLE 1 a. 50 parts by weight of an 25% aqueous solution of NAP-1 (see Table 2) is added to 100 parts of an aqueous solution of PCA-1 (see Table 1) while stirring well mechanically at 20° C. The viscosity of the solution rises and a gelling condition occurs temporarily but as stirring is continued, the gelled condition disappears and the solution becomes uniform. On adjusting the pH to 7 with 25% caustic soda solution, a 25% solution of polymer salt (PIC-1) as set out in Table 3) is obtained.

EXAMPLES 2–15

Aqueous solutions of polymer salts (PIC-2 to 15 of Table 3 below) can be prepared from the appropriate poisoners NAP 2 to 15 (Table 2) and PCA 2 to 15 (Table 1) according to the method of Example 1 above.

b. Samples of the polymer salt solutions (PIC-1 to 15) of Table 3 are mixed together with cement, sand, gravel and water to produce concrete and the slump loss prevention effects of the samples ascertained. The materials used and details of the mixing conditions (a) and (b) are given in Table 4. The results of measurements on carrying out concrete tests in accordance with JIS A 6204 are given in Tables 5 and 6 below:

TABLE 1

| PCA-polymer | Type of monomer | GPC analysis result Mw[1] |
|---|---|---|
| PCA-1 | MAA, HPMA | 8,000 |
| 2 | AA, HEA | 6,000 |
| 3 | MAA, MPEGMA | 20,000 |
| 4 | ST, MPEGMLA | 15,000 |
| 5 | ST, BUMLA | 10,000 |
| 6 | MPEGAE, MLA | 10,000 |
| 7 | VAC, MLA | 7,000 |
| 8 | MVE, MLA | 7,000 |
| 9 | MAA, THPA, MMA | 6,000 |

[1]Average molecular weight in terms of polystyrene in GPC analysis

| NAP-polymer | Type of monomer | GPC analysis result Mw[1] |
|---|---|---|
| NAP-1 | AM, DMAPMAM | 23,000 |
| 2 | AM, MADCDA | 10,000 |
| 3 | AM, DMMAM | 400,000 |
| 4 | AM, DMAM | 200,000 |
| 5 | AM, ADCDA | 100,000 |
| 6 | AM, MMAM, ADCDA | 40,000 |
| 7 | ST, AM, DMAPMAM | 20,000 |

[1]Average molecular weight in terms of polystyrene in GPC analysis

TABLE 3

| Sample | Polymer used from Tables 1 and 2 | Reaction wt ratio | 25% aqueous solution viscosity[1] (cps) |
|---|---|---|---|
| PIC-1 | PCA-1: NAP-1 | 1:0.5 | 306 |
| 2 | PCA-2: NAP-1 | 1:1 | 360 |
| 3 | PCA-3: NAP-1 | 1:0.2 | 170 |
| 4 | PCA-3: NAP-1 | 1:0.5 | 500 |
| 5 | PCA-3: NAP-1 | 1:0.1 | 470 |
| 6 | PCA-4: NAP-1 | 1:0.2 | 320 |
| 7 | PCA-4: NAP-1 | 1:0.05 | 690 |
| 8 | PCA-3: NAP-1 | 1:0.005 | 900 |
| 9 | PCA-3: NAP-1 | 1:0.06 | 540 |

TABLE 3-continued

| Sample | Polymer used from Tables 1 and 2 | Reaction wt ratio | 25% aqueous solution viscosity[1] (cps) |
|---|---|---|---|
| 10 | PCA-3: NAP-1 | 1:0.01 | 320 |
| 11 | PCA-4: NAP-1 | 1:0.05 | 400 |
| 12 | PCA-6: NAP-1 | 1:0.05 | 350 |
| 13 | PCA-7: NAP-1 | 1:0.05 | 360 |
| 14 | PCA-8: NAP-1 | 1:0.1 | 250 |
| 15 | PCA-9: NAP-1 | 1:0.1 | 310 |

Note: [1]Measured with B-type viscometer at 20° C. and 60 rpm in 24 hours after reaction.

TABLE 4

| Mix | Water-cement ratio | Sand-aggregate ratio s/a (%) | Unit content (kg/m$^3$) C | W |
|---|---|---|---|---|
| (a) | 0.625 | 49 | 320 | 200 |
| (b) | 0.510 | 47 | 320 | 166 |

Materials Used
Cement: Ordinary portland cement (blend of 3 brands in equal parts: specific gravity, 3.16)
Fine aggregate: Blend of Oi River system pit sand and Kisarazu mountain sand (specific gravity, 2.62; F.M., 2.71)
Coarse aggregate: Ome, Tokyo, graywacke crushed stone (specific gravity, 2.64, max. size, 20 mm)
High range water-reducing agent
BNS: condensate of formaldehyde and naphthalene sulfonic acid
MS: condensate of formaldehyde and melamine sulfonic acid

TABLE 5

Concrete Test Results (Part 1)[1]

| No. | Sample Kind | Dosage[2] | Concrete slump (cm) [Air (volume %)][3] As mixed | 30 min | 60 min | 90 min |
|---|---|---|---|---|---|---|
| Comparison Example | | | | | | |
| 1 | Plain | — | 19.0 [2.0] | 17.0 [2.0] | 15.5 [1.8] | 12.5 [1.7] |
| 2 | BNS | 0.50 | 18.0 [4.4] | 10.5 [4.1] | 6.5 [3.8] | 4.0 [3.3] |
| 3 | MS | 0.60 | 18.5 [4.2] | 9.5 [4.0] | 6.5 [3.9] | 4.0 [3.1] |
| 4 | PCA-1 Na[4] | 0.20 | 18.0 [5.0] | 15.0 [4.7] | 12.5 [4.4] | 8.0 [4.0] |
| Example | | | | | | |
| 1 | PIC-1 | 0.25 | 18.0 [4.3] | 18.0 [4.2] | 17.0 [4.0] | 16.5 [4.7] |
| 2 | 2 | 0.30 | 16.0 [4.6] | 17.5 [5.1] | 18.5 [5.0] | 18.0 [4.9] |
| 3 | 3 | 0.24 | 18.0 [4.2] | 21.0 [4.9] | 20.5 [4.7] | 18.5 [4.7] |
| 4 | 4 | 0.25 | 17.5 [3.7] | 20.5 [4.3] | 20.0 [4.5] | 19.0 [4.8] |
| 5 | 5 | 0.18 | 1910 [5.0] | 18.5 [4.2] | 17.5 [4.4] | 16.5 [5.1] |
| 6 | 6 | 0.28 | 19.5 [4.8] | 20.5 [4.3] | 20.0 [4.7] | 19.0 [4.9] |
| 7 | 7 | 0.28 | 18.5 [4.6] | 20.5 [4.0] | 20.0 [4.2] | 18.0 [4.4] |
| 8 | 8 | 0.30 | 16.0 [4.0] | 20.5 [4.0] | 20.0 [4.2] | 18.5 [4.5] |
| 9 | 9 | 0.30 | 20.9 [4.7] | 20.5 [4.0] | 19.0 [3.6] | 18.5 [4.3] |
| 10 | 10 | 0.30 | 18.0 [5.0] | 21.0 [5.2] | 20.0 [5.0] | 18.5 [5.3] |
| 11 | 11 | 0.32 | 18.0 [4.0] | 23.0 [4.8] | 20.0 [4.7] | 18.0 [4.9] |
| 12 | 12 | 0.32 | 16.0 [4.0] | 18.0 [4.2] | 21.0 [4.5] | 18.0 [4.7] |
| 13 | 13 | 0.32 | 17.5 [4.7] | 22.0 [3.7] | 19.0 [4.0] | 20.0 [4.4] |
| 14 | 14 | 0.32 | 20.0 [5.3] | 19.0 [5.0] | 18.0 [4.9] | 17.5 [4.5] |
| 15 | 15 | 0.32 | 19.0 [4.7] | 20.0 [4.5] | 18.0 [4.8] | 17.0 [5.0] |

Notes:
[1]Mix conditions for Mix (a) of Table 4 in Comparison Example 1 only, with all other mixes Mix (b). Mixing performed with forced-mixing type mixer.
[2]Percent solids by weight of cement.
[3]Mixing for time-dependent change performed using tilting mixer at 2 rpm.
[4]PCA-1Na indicates Na salt of PCA-1.

TABLE 6

Concrete Test Results (Part 2)[1]

| No. | Sample Kind | Dosage | Slump (cm) | Air (Vol. %) | Time of setting (hr-min) Initial | Final | 28-d comp. strength (kgf/cm$^2$) |
|---|---|---|---|---|---|---|---|
| Comparison Example | | | | | | | |
| 1 | Plain | — | 18.0 | 2.0 | 5-14 | 7-50 | 329 |
| 2 | BNS | 0.50 | 18.0 | 4.4 | 5-30 | 7-30 | 407 |
| 3 | MS | 0.60 | 18.5 | 4.2 | 5-30 | 7-40 | 410 |
| 4 | PCA-1 Na[3] | 0.20 | 18.0 | 5.0 | 6-15 | 8-30 | 419 |
| Example | | | | | | | |
| 1 | PIC-1 | 0.25 | 18.0 | 4.3 | 6-50 | 9-00 | 482 |
| 2 | 2 | 0.30 | 16.0 | 4.6 | 6-40 | 8-50 | 470 |
| 3 | 3 | 0.24 | 18.0 | 4.2 | 6-30 | 8-40 | 428 |
| 4 | 4 | 0.25 | 17.5 | 3.7 | 6-45 | 8-50 | 440 |
| 5 | 5 | 0.18 | 19.0 | 5.0 | 6-00 | 8-30 | 420 |
| 6 | 6 | 0.28 | 19.5 | 4.8 | 7-00 | 9-10 | 490 |
| 7 | 7 | 0.28 | 18.5 | 4.6 | 7-15 | 9-15 | 482 |
| 8 | 8 | 0.30 | 16.0 | 4.0 | 6-35 | 8-40 | 445 |
| 9 | 9 | 0.30 | 20.0 | 4.7 | 7-30 | 9-15 | 495 |
| 10 | 10 | 0.30 | 18.0 | 5.0 | 7-00 | 9-05 | 471 |
| 11 | 11 | 0.32 | 18.0 | 4.0 | 6-20 | 8-50 | 480 |
| 12 | 12 | 0.32 | 16.0 | 4.0 | 6-00 | 8-10 | 455 |
| 13 | 13 | 0.32 | 17.5 | 4.6 | 5-50 | 8-00 | 437 |

TABLE 6-continued

Concrete Test Results (Part 2)[1]

| No. | Sample Kind | Dosage | Slump (cm) | Air (Vol. %) | Time of setting (hr-min) Initial | Time of setting (hr-min) Final | 28-d comp. strength (kgf/cm$^2$) |
|---|---|---|---|---|---|---|---|
| 14 | 14 | 0.32 | 20.0 | 5.0 | 6-30 | 8-40 | 440 |
| 15 | 15 | 0.32 | 19.0 | 4.7 | 6-40 | 9-05 | 472 |

Notes:
[1] Mix conditions for Mix (a) of Table 4 in Comparison Example 1 only, with all other mixes Mix (b). Mixing performed with forced-mixing type mixer.
[2] Percent solids by weight of cement.
[3] PCA-1Na indicates Na salt of PCA-1.

Table 5 shows the slumps of concrete using BNS (the condensate of formaldehyde with naphthalene sulfonic acid) and MS (the condensate of melamine sulfonic acid with formaldehyde) which are high range water reducing agents. The slumps of concrete using the polymer salt solution of this invention hardly decrease after 90 minutes.

What is claimed is:

1. An aqueous solution, for use as a cement dispersing agent, of a polymer salt, which is formed by reacting 1 part by weight of a polycarboxylic acid with 0.001 to 10 parts by weight of a nitrogenous acrylic polymer.

2. A solution according to claim 1 in which the solution is at neutral pH.

3. A solution according to claim 1, in which the amount of nitrogenous acrylic polymer is 0.005 to 1 part by weight per 1 part of polycarboxylic acid.

4. A solution according to claim 1 in which the polycarboxylic acid is one that is obtained from a monomer selected from methacrylic acid,
   crotonic acid,
   maleic anhydride,
   maleic acid,
   maleic monoester,
   tetrahydrophthalic anhydride
   tetrahydrophthalic acid, acrylic acid and
   a monomer capable of being copolymerized with one or more of the above.

5. A solution according to claim 4 in which the polycarboxylic acid is selected from the following:
   a copolymer of (meth)acrylic acid and hydroxypropyl(meth)acrylate,
   a copolymer of (meth)acrylic acid and methyl polyethylene glycol (meth)acrylate,
   a copolymer of styrene and methyl polyethylene glycol maleate,
   a copolymer of styrene and butyl maleate,
   a copolymer of methyl polyethylene glycol allyl ether and maleic acid,
   a copolymer of vinyl acetate and maleic acid and
   a copolymer of methyl vinyl ether and maleic acid.

6. A solution according to claim 1 in which the nitrogenous acrylic polymer is one obtained from a monomer selected from
   dialkyl amino alkyl methacrylamide,
   dialkyl amino alkyl acrylamide,
   monoalkyl methacrylamide,
   monoalkyl acrylamide
   dialkyl methacrylamide,
   dialkyl acrylamide,
   methacryloyl dicyanodiamide,
   acryloyl dicyanodiamide,
   dialkyl aminoalkyl methacrylate,
   dialkyl amino alkyl acrylate and
   a monomer capable of being copolymerized with one or more of the above mentioned monomers.

7. A solution according to claim 6 in which the nitrogenous acrylic polymer is selected from the following:
   a copolymer of acrylamide and methacryloyl dicyanodiamide,
   a copolymer of acrylamide and dimethyl aminopropyl methacrylamide,
   a copolymer of acrylamide and dimethyl aminoethyl methacrylate,
   a copolymer of acrylamide and dimethyl aminomethyl acrylamide, and
   a copolymer of acrylamide and dimethyl acrylamide.

8. A polymer salt formed by reacting 0.001 to 10 parts by weight of a nitrogenous acrylic polymer with 1 part by weight of a polycarboxylic acid.

9. A polymer salt according to claim 8 in which the amount of nitrogenous acrylic polymer is 0.005 parts to 1 part of nitrogenous acrylic polymer to 1 part of polycarboxylic acid.

* * * * *